United States Patent [19]

Miyauchi et al.

[11] Patent Number: 4,724,732

[45] Date of Patent: Feb. 16, 1988

[54] METHOD OF CONTROLLING A ROTARY CUTTER

[75] Inventors: Reizo Miyauchi; Kenji Kuwahara; Isao Takami; Yujiro Shimizu; Kenji Fujiwara; Hiroshi Kuromaru, all of Takasago, Japan

[73] Assignee: Mitsubishi Jukogyo Kabushiki Kaisha

[21] Appl. No.: 893,319

[22] PCT Filed: Nov. 15, 1985

[86] PCT No.: PCT/JP85/00638

§ 371 Date: Jul. 28, 1986

§ 102(e) Date: Jul. 28, 1986

[87] PCT Pub. No.: WO86/03150

PCT Pub. Date: Jun. 5, 1986

[30] Foreign Application Priority Data

Nov. 30, 1984 [JP] Japan .................. 59-253047

[51] Int. Cl.$^4$ ............................................. B26D 31/00
[52] U.S. Cl. ............................................. 83/37; 83/295
[58] Field of Search ............................. 83/37, 295

[56] References Cited

U.S. PATENT DOCUMENTS 4,090,118  5/1978  Smith ................... 83/295 X 4,497,229  2/1985  Carrington et al. .......... 83/295 X

FOREIGN PATENT DOCUMENTS 49-100682  9/1974  Japan .
55-106721  8/1980  Japan .

Primary Examiner—Donald R. Schran
Attorney, Agent, or Firm—Toren, McGeady & Associates

[57] ABSTRACT

A method of controlling a rotary cutter in which material of long size such as steel plate or corrugated cardboard moving between a pair of rotating shears each having a shearing edge on its peripheral surface is cut in a predetermined cut length by controlling a motor for driving the shears, wherein the provision of steps of calculating an optimum shear position with minimum energy on the basis of moving quantity of the material, calculating minimum optimum shear velocity and optimum motor current on the basis of the moving quantity of the material and moving velocity of the material, and rotating the shears so that the calculated condition is realized. The shear position and the shear velocity of the rotary cutter and the drive motor current are selected to the optimum condition with minimum energy and operation can be made under the condition of minimum energy.

1 Claim, 15 Drawing Figures

Lo > 2Ls

Lo = Ls

Lo = 2Ls

Lo < Ls

2Ls > Lo > Ls $Lo > 3Ls$ $Lo = Ls$ $Lo = 3Ls$ $Lo < Ls$ $3Ls > Lo > Ls$

METHOD OF CONTROLLING A ROTARY CUTTER

BACKGROUND OF THE INVENTION

1. Field of the Invention

The present invention relates to a method of controlling a rotary cutter for cutting material of long size moving between a pair of rotating shears having shearing edges on its peripheral surface in a predetermined length by controlling a motor for driving the shears.

2. Description of Related Art

An apparatus shown in FIG. 5 is heretofore employed to cut steel plate or corrugated cardboard moving on a line in a predetermined exact length of sheet. The apparatus obtains a moving quantity of material 15, such as corrugated cardboard, moving from left to right in FIG. 5 at a speed V by integrating an output of a pulse generator 1 coupled with rollers 30. The moving quantity of the material 15, a rotating velocity of shearing edges 13 which is obtained from a pulse generator 11 coupled with the shearing edges 13, and a rotating quantity, obtained by integrating the rotating velocity are supplied to a control unit 12. A control command, produced on the basis of the time when a proximity switch 36 for the shearing edges 13 detects completion of cutting the material, is applied to a motor 9 so that the motor 9 drives the shearing edges 13 through a gearing mechanism 14.

This apparatus is now described in more detail. Referring to FIG. 6, a counter 2 produces a moving quantity LL of the material and a velocity calculator 3 produces a speed VL of the material on the basis of the signal from the pulse generator 1. On the other hand, a counter 8 produces a moving quantity LS of the shears and a velocity calculator 16 produces a velocity VS of the shears on the basis of the signal from the pulse generator 11. The material moving quantity LL and the shear moving quantity LS are supplied to an adder 17 to obtain $\Delta L$. The value $\Delta L$ is supplied to a gain table number calculator 4 which supplies a table number I to a movement gain table 5 and a velocity gain table 6. The movement gain table 5 obtains a gain coefficient GL in accordance with the table number I to produce $GL \cdot \Delta L$. In the same manner, the gain table 6 produces $GV \cdot \Delta V$ where the value $\Delta V$ is an output of an adder 18 to which the shear velocity VS and the material speed VL are supplied. Thus, the material moving velocity VL, the moving quantity $GL \cdot \Delta L$, which is added on the basis of the $\Delta L$, and the velocity $GV \cdot \Delta V$ are supplied to an adder 19 which produces a velocity command VR to control a velocity controller 7. A rotational number of the motor 9 is supplied to the velocity controller 7 from a pulse generator 10.

With such an apparatus, when a cut length of the material 15 is longer than a peripheral length of the shearing edges 13, the velocity command supplied to the motor 9 is as shown in FIG. 7. That is, the shear velocity VS with regard to the material velocity (line speed) VL is adjusted, and if a distance that the material 15 is moved until stopped after the shear edges 13 complete the cutting is $L_1$, the control unit 12 produces only a constant deceleration command without feedback control during $0 < LL < L_1$. If a distance that the material 15 is moved until the shearing edges 13 start to be accelerated after the shear edges 13 is once stopped after completion of cutting is $L_2$ and the moving distance until synchronized with the velocity of the material 15 after acceleration is $L_3$, the above value $\Delta L$ is obtained and the velocity command is supplied to the speed controller 7 during $L_2 < LL < L_3$.

As basic commands to cut the material, it is required that a cut length is equal to a specified length and the line velocity in cutting is equal to a speed of the shear edges 13. Accordingly, it is required that an exactly constant length of material 15 is fed during from deceleration to acceleration of the shear edges 13 and the line velocity VL and the shear velocity VS coincide with each other at the time of cutting.

However, the prior art apparatus possesses the following problems.

(1) When the position gain is raised as compared with the velocity gain near the cut position to obtain an exact position, the line velocity VL does not coincide with the shear velocity VS upon cutting. Further, when the speed gain is raised to match the velocity, the accuracy of the cut length is degraded. Accordingly, fine adjustment is required to maintain the cutting performance and it is hence difficult to maintain the accuracy in an actual apparatus in which the line velocity VL is varied delicately.

(2) Acceleration and deceleration require large energy and hence energy efficiency is degraded.

(3) A large capacity motor and a drive system therefor are required.

SUMMARY OF THE INVENTION

The present invention has been proposed in order to solve the above prior art problems, and an object of the present invention is to provide a method of controlling a rotary cutter in which high cutting accuracy is maintained and operation is effected with minimum energy to reduce the power of a motor and minimize the running cost.

To this end, an optimum shear position ($x_1^{}(l_j)$) with minimum energy is calculated from moving quantity ($l_j$) of material, and an optimum shear velocity ($x_2^{}(l_j)$) and an optimum motor current ($i^{**}(l_j)$) with minimum energy are calculated from the moving quantity ($l_j$) of the material and moving velocity ($V_j$) of the material, respectively. The shears are rotated in order to realize the above calculated condition.

According to the present invention with such a configuration, optimum control input (optimum motor current) and optimum track (optimum shear position) are obtained as function of the moving quantity (moving distance) of the material. These parameters are supplied as feed-forward inputs to a servo-system, for example, that is, inputs for performing necessary correction before influence due to variation of the moving quantity of the material appears in a control system, to control the shear, so that control accuracy can be enhanced and operation with minimum energy can be made.

DESCRIPTION OF THE PREFERRED EMBODIMENT

An embodiment of the present invention is now described in detail with reference to the attached drawings.

Figure 1:
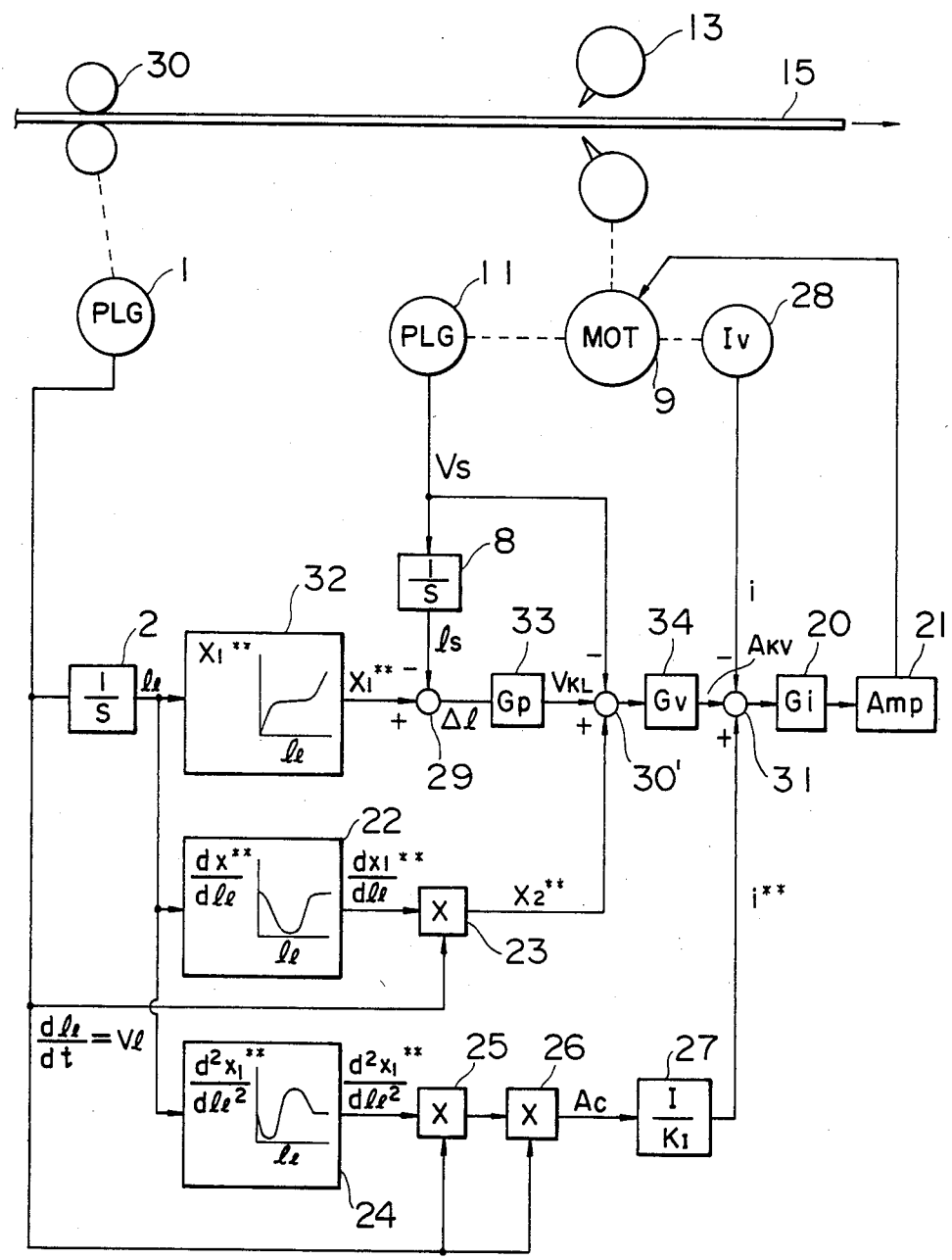
FIG. 1 is a block diagram showing an embodiment of a control unit used to implement a method of controlling a rotary cutter according to the present invention.
Figure 5:
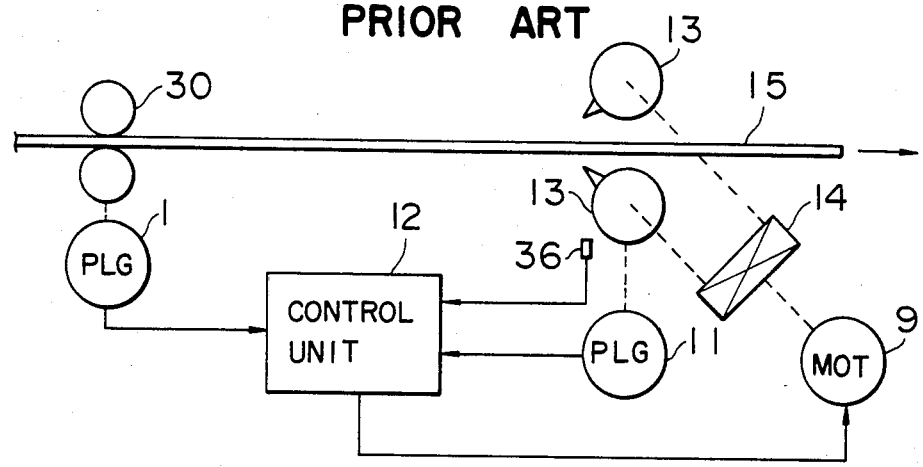
FIG. 5 schematically illustrates a configuration of a prior art rotary cutter.

FIG. 1 illustrates a configuration of an embodiment of the control unit used to implement the method of the present invention, in which like elements to those of FIG. 5 are given like numerals and description thereof is simplified.

An output Vl of the pulse generator 1 coupled with the roller 30 is integrated with regard to time in an integrator 2, which produces a material moving distance (moving quantity) $l_l$ which is supplied to an optimum position command generator 32, an optimum velocity ratio command generator 22 and an optimum acceleration ratio command generator 24. The generators 32, 22 and 24 possess ideal curve characteristics made in accordance with a cut length Lo. The curves possess characteristics which do not vary due to variation of the material moving velocity. The characteristics and optimality are described later.

On the other hand, the pulse generator 11 supplies moving velocity Vs of the shearing edges 13 to an integrator 8 which integrates the moving velocity Vs with regard to time to produce moving quantity ls of the shear edges. The shear edge moving quantity ls is subtracted from the output $x_1^{}$ of the position command generator 32 in a subtractor 29 which produces position deviation $\Delta l = x_1^{} - ls$. The position deviation $\Delta l$ is supplied to a position controller 33 and the controller 33 produces $V_{KL}$.

Further, the velocity ratio command $dx_1^{}/dl_l$ produced from the velocity ratio command generator 22 is multiplied by the output $dl_l/dt(Vl)$ produced from the pulse generator 1 in a material velocity multiplier 23 which produces a speed command $dx_1^{}/dt(=x_2^{})$. The velocity command $x_2^{}$ is added to $V_{KL}$ from which Vs is subtracted in an adder 30' to obtain a velocity deviation $\Delta V = V_{KL} + x_2^{**} - Vs$, which is supplied to a velocity controller 34 which produces Akv.

An acceleration ratio command $d^2x_1^{}/dl_l^2$ produced from the acceleration ratio command generator 24, which is supplied with the material moving quantity $l_l$, is multiplied by the output $dl_l/dt$ of the pulse generator 1 in two series connected material velocity multipliers 25 and 26 to obtain an acceleration command $d^2x_1^{}/dt^2 = Ac$. The acceleration command Ac is supplied to a constant multiplier 27 which produces a current command $i^{**}$. A coefficient established in the multiplier is $I/K_I$, where $K_I$ is a torque constant of the motor and I is an inertia moment of the motor and the shear. There is a relation between the acceleration Ac and the motor current i, as follows:

$$i = \frac{I}{K_I} Ac$$

Therefore, if the acceleration Ac is multiplied by $I/K_I$, the current i can be obtained from the acceleration Ac.

The current command $i^{}$ is added to the above output Akv from which is subtracted an armature current i of the motor 9, detected by a current detector 28, in an adder 31 which produces a current deviation $\Delta i = i^{} + Akv - i$. The output of the adder 31 is supplied through a current controller 21 to the motor 9 as a command.

Configurations of the optimum position command generator 32, the optimum velocity ratio command generator 22 and the optimum acceleration ratio command generator 24 are now described.

The equation of motion of the shear is given by:

$$I \frac{d^2 l_l}{dt^2} = K_I \cdot i \tag{1}$$

In order to minimize the consumption energy of the motor, the evaluation function is selected as follows:

$$J = \int_o^T i^2 dt \to \min \tag{2}$$

where J is proportionally related with energy consumption. The termination time T, initial condition and terminal condition, are as follows:

Termination time $\quad T = Lo/V_l \tag{3}$

Initial condition $\quad \left. \begin{array}{l} x_1(0) = 0 \\ x_2(0) = V_l \end{array} \right\} \tag{4}$ Terminal condition $\quad \left. \begin{array}{l} x_1(T) = Ls \\ x_2(T) = V_l \end{array} \right\} \tag{5}$ where Lo is a desired cut length and Ls is a shear peripheral length.

The equation (3) shows that the cutting time is given by $Lo/V_l$. It is assumed that the shear position at the beginning is 0 and the shear velocity is synchronized with the line velocity. The terminal condition shows that when the material is moved by Lo, the shear must make just one revolution, and the shear velocity must be synchronized with the line speed. Cutting is performed upon termination. In a next cutting operation, this terminal condition becomes the initial condition and cutting is done in the same manner. The condition state space equation of the controlled object is as follows:

$$\left. \begin{array}{l} \frac{dx_1}{dt} = x_2 \\ \frac{dx_2}{dt} = m \end{array} \right\} \tag{6}$$

where $m = K_I \cdot i/I$, $x_1$ is the shear position, and $x_2$ is the shear velocity.

With regard to the system expressed by the equation (6), an optimum control input $m^*$ and optimum trajectories $x_1^*$ and $x_2^*$ for minimizing the equation (2) under conditions of the equations (3), (4) and (5) are calculated, using the maximum principle, as follows:

$$m^* = \frac{Ls - V_l T}{\frac{1}{12} T^4} \left( -T \cdot t + \frac{T^2}{2} \right) \quad (7)$$

Position trajectory $$\left.\begin{aligned} x_1^*(t) &= \frac{12(Ls - V_l T)}{T^4} \left( -\frac{T}{6} t^3 + \frac{T^2}{4} t^2 \right) + V_l t \\ \text{Velocity trajectory} \\ x_2^*(t) &= \frac{12(Ls - V_l T)}{T^4} \left( -\frac{T}{2} t^2 + \frac{T^2}{2} t \right) + V_l \end{aligned}\right\} \quad (8)$$

The value of the evaluation function is given by:

$$\min J = 12 \frac{Ls - V_l T}{\left(\frac{K_l}{I}\right)^2} T^{-3} \quad (9)$$

The foregoing is a simple application of the maximum principle and is effected only when the line velocity $V_l$ is constant. However, the line velocity $V_l$ is actually varied momentarily. In the optimum problem, taking into consideration the velocity variation, the termination time and the boundary condition are given as follows:

Termination time $\quad \int_0^T V_l dt = Lo \quad (10)$
($Lo:$ = cut length)

Initial condition $\quad \left.\begin{aligned} x_1(0) &= 0 \\ x_2(0) &= V_l(0) \end{aligned}\right\} \quad (11)$ Terminal Condition $\quad x_1(T) = Ls \quad (12a)$ $\quad x_2(T) = V_l(T) \quad (12b)$
($Ls:$ peripheral length of shear)

Since the variation of the line velocity cannot be known previously, an optimum solution cannot be obtained at the beginning of control. Hence, the following sub-optimal control concept is applied, and a new control method, which is the point of the present invention, is conducted.

The sub-optimal concepts are as follows:
(1) When there is no variation in the line velocity, the optimality is ensured and the equation (10) is satisfied.
(2) When there is variation in the line velocity, the optimality collapses but the equation (12) is satisfied.

When there is no variation in the line velocity, the optimum trajectory is as follows:

$$x_1^*(t) = (Ls - V_l T) \left\{ -2 \left(\frac{t}{T}\right)^3 + 3 \left(\frac{t}{T}\right)^2 \right\} + V_l t \quad (13)$$

$$x_2^*(t) = \frac{(Ls - V_l T)}{T} \left\{ -6 \left(\frac{t}{T}\right)^2 + 6 \left(\frac{t}{T}\right) \right\} + V_l \quad (14)$$

The following equations are used to transform the equation (13):

$$V_l T = Lo \quad (15)$$

$$V_l t = l_l \quad (16)$$

Then, the position trajectory is a function including only the moving quantity $l_l$ of the material, as shown by the following equation:

$$x_1^{**}(l_l) = (Ls - Lo) \left\{ -2 \left(\frac{l_l}{Lo}\right)^3 + 3 \left(\frac{l_l}{Lo}\right)^2 \right\} + l_l \quad (17)$$

The fact that the equation (17) satisfies the sub-optimal feature mentioned above, can be easily ensured as follows: When $V_l$ is constant, the equation (17) produces the optimum trajectory. Since substituting the equations (15) and (16) into the equation (17) makes the equation (13), the sub-optimal concept (1) is satisfied. When $l_l$ is $Lo$, the moving quantity $x_1^{**}(Lo)$ of the shear is as follows:

$$x_1^{**}(Lo) = Ls \quad (18)$$

Accordingly, the equation (17) satisfies the equation (12a), which is the constant of the sub-optimal concept (a).

The equation (17) is differentiated by time to obtain the velocity trajectory.

$$x_2^{}(l_l) = \frac{d}{dt} x_1^{}(l_l) \frac{dx_1^{**}(l_l)}{dl_l} \cdot \frac{dl_l}{dt}$$

The term $dx_1^{**}(l_l)/dl_l$ is calculated by differentiating the equation (17), then:

$$x_2^{**}(l_l) = \left[ (Ls - Lo) \left\{ -6 \frac{l_l^2}{Lo^3} + 6 \frac{l_l}{Lo^2} \right\} + 1 \right] V_l \quad (19)$$

where $V_l = dl_l/dt$.

The initial condition and the terminal condition of the equation (19) are as follows and the boundary condition is satisfied:

$$x_2(0) = x_2^{**}(0) = V_l(0)$$

$$x_2(T) = x_2^{**}(Lo) = V_l(T)$$

Accordingly, the equation (17) satisfies the equation (12b), and it is shown that the position trajectory, which is described by the equation (17), satisfies the sub-optimal feature.

By differentiating the equation (19) by time, the control input, which generates the sub-optimal position trajectory, is obtained as follows:

$$i^{}(l_l) = \frac{I}{K_l} m^{}(l_l) = \frac{I}{K_l} \frac{d}{dt} x_2^{**} \quad (20)$$

$$= \frac{I}{K_l} \left[ (Ls - Lo) \left\{ -12 \frac{l_l}{Lo^3} + \frac{6}{Lo^2} \right\} + 1 \right] V_l^2 +$$

$$\frac{I}{K_I}\left[(Ls - Lo)\left(-6\frac{l_l^2}{Lo^3} + 6\frac{l_l}{Lo^2}\right) + 1\right] ml$$

where $ml = dV_l/dt$ and this is the line acceleration.

Now it is understood that when $l_l$, $V_l$ and $ml$ are mounted, the sub-optimal control input can be generated by the equation (20).

When the control input shown by the equation (20) is supplied, a difference between a mathematical model and an actual machine, makes it difficult to actually satisfy the terminal condition. Accordingly, the shear drive system forms a servo system in which the motor current, the motor velocity and the position are fed back and the follow-up control (with a target being varied) in which the optimum trajectory of the shear position expressed by the equation (17) is a target is performed. The velocity trajectory of the equation (19) and the current trajectory of the equation (20) are used as auxiliary inputs for increasing the follow-up performance.

In addition, since the second term of the equation (20) is extremely smaller as compared with the first term thereof, the first term is actually neglected.

As described above, the sub-optimal position command generator 32 produces $x_1^{**}$ by calculating the equation (17) with $l_l$ as a variable.

The sub-optimal speed ratio command generator 22 produces $dx_1^{**}/dl_l$ on the basis of the following equation with $l_l$ as a variable.

$$\frac{dx_1^{**}}{dl_l} = (Ls - Lo)\left(-6\frac{l_l^2}{Lo^3} + 6\frac{l_l}{Lo^2}\right) + 1 \quad (21)$$

The optimum acceleration ratio command generator 24 produces $d^2x_1^{**}/dl_l^2$ on the basis of the following equation with $l_l$ as a variable.

$$\frac{d^2x_1^{**}}{dl_l^2} = (Ls - Lo)\left(-12\frac{l_l}{Lo^3} + \frac{6}{Lo^2}\right) + 1 \quad (22)$$

Operation of the above embodiment of the present invention is now described.

The embodiment of the present invention forms a servo system in which the sub-optimal trajectory $x_1^{}$ is a target and the operation of the shear position approximates $x_1^{}$. When the servo system is given only $x_1^{**}$ as a target, a delay in the following operation of the servo system is produced and deviation from the optimum trajectory is increased. However, since the sub-optimal velocity command and the sub-optimal current command is added to the velocity at the current controller 21, the trajectory highly approximating the sub-optimal trajectory is formed.

As describe above, according to the present invention, excellent effects as described below are attained.

(1) Low consumption of energy

Figure 7:
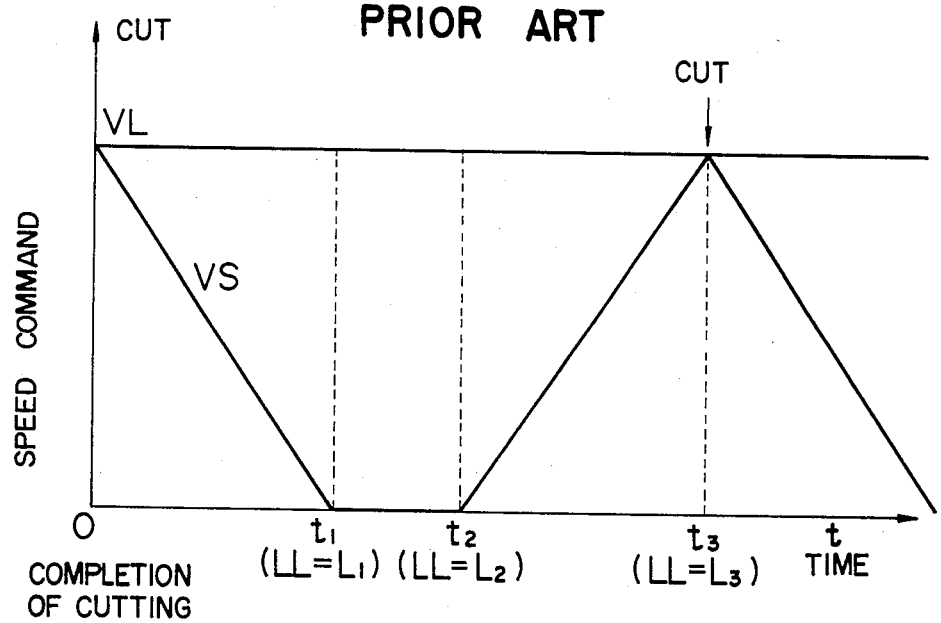
FIG. 7 is the same graph as FIG. 3 illustrating velocity track pattern when a prior art method is implemented.
Figure 6:
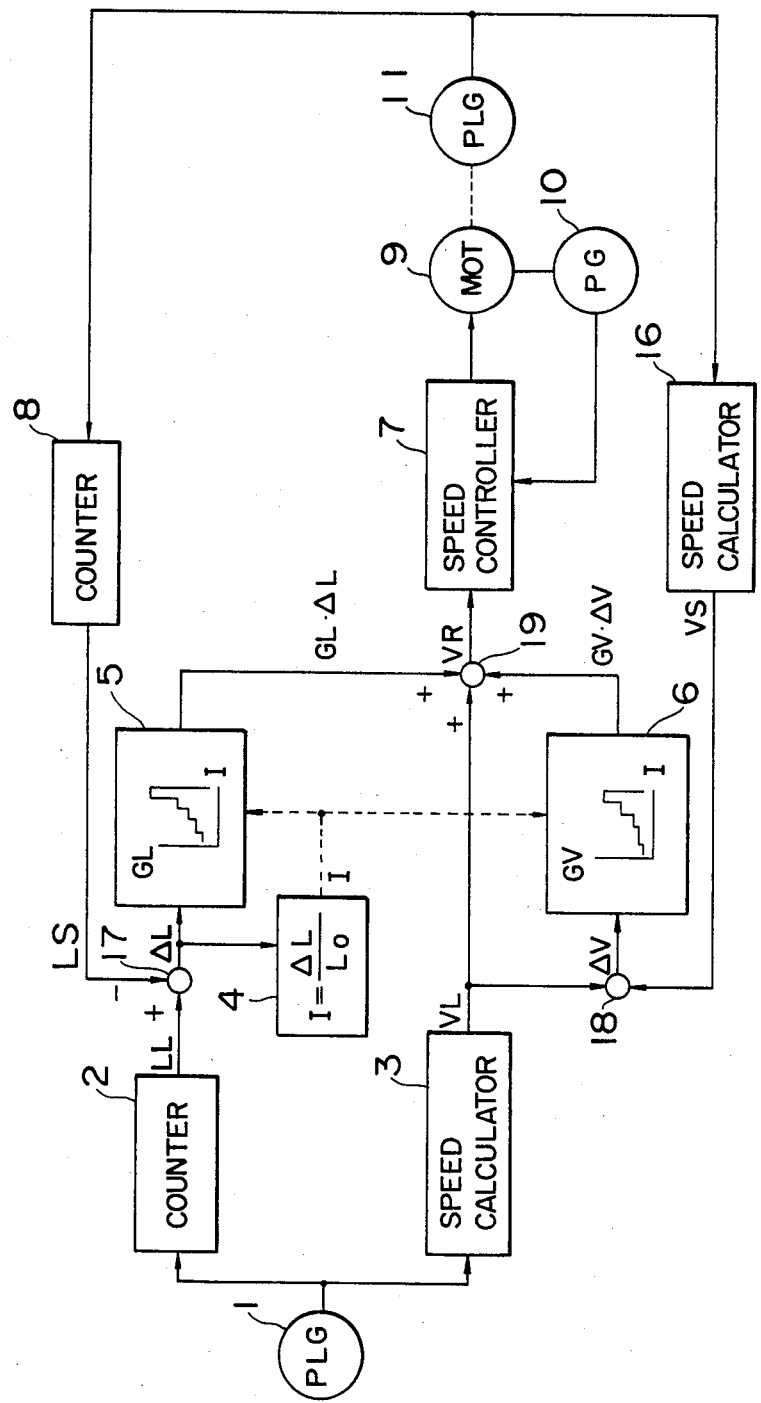
FIG. 6 is a block diagram of a control unit for the rotary cutter shown in FIG. 5.

The prior art system varies the velocity linearly as shown in FIG. 7. When cutting is made in a case where $t_1 = t_2$ in FIG. 7, that is, without a pause period, the largest load is imposed on the motor. The motor capacity is selected on the basis of this condition (hereinafter referred to as heavy duty cycle).

The heavy duty cycle is produced when the cut length Lo is twice the peripheral length Ls of the shear.

$$Lo = 2Ls \quad (23)$$

When the line velocity $V_l$ is constant, it is necessary that the line is moved by the cut length at the termination time T.

$$V_l \cdot T = Lo \quad (24)$$

From the equations (23) and (24), the terminal time in the heavy duty case is obtained as follows:

$$T = 2Ls/V_l \quad (25)$$

When a current value is required to decelerate from $V_l$ to 0 in time T/2 and accelerate from 0 to $V_l$ in the next time T/2, the following equation is satisfied.

$$V_l = a \cdot \frac{T}{2} = a \frac{Ls}{V_l} = \frac{K_I}{I} i \frac{Ls}{V_l} \quad (26)$$

Therefore, from this equation, the current value required to decelerate from $V_l$ to 0 in time T/2, and to accelerate from 0 to $V_l$ in the next time T/2, is given by:

$$i = \frac{I}{LsK_I} V_l^2$$

A value of the equation (2) for the evaluation function, which proportionally relates energy consumption during one cycle, is given by:

$$J = 2\left(\frac{I}{K_I}\right)^2 \frac{V_l^2}{Ls} \quad (27)$$

On the other hand, when cutting where $Lo = 2Ls$ is performed in accordance with the present invention, the value of the equation (2) for the evaluation function is given by:

$$J\min = \frac{12}{8}\left(\frac{I}{K_I}\right)^2 \frac{V_l^3}{Ls}$$

It is understood from this equation that the energy required to drive, that is, the energy consumption, is 75% of the prior art system.

(2) Adoption of small motor

Since the energy required to drive is 75% of the prior art, the capacity of the motor can be reduced to 75% of the prior art.

(3) Exact cutting (1)

While mere application of the maximum principle deteriorates the accuracy of cutting and velocity due to external disturbances such as a variation of line velocity and practical use is difficult, exact cutting is attained even if there is a variation of the line velocity since the optimum position of the shear is given as a function of the moving distance of the material.

(4) Exact cutting (2)

Since the optimum shear velocity and the optimum motor current are obtained from the material moving distance and the material velocity and supplied to the servo system as a feedback input, the control accuracy can be further enhanced and operation with minimum energy can be attained.

(5) Smooth acceleration and deceleration

Since the acceleration and deceleration are smoothly effected as compared with the prior art trajectory of the velocity, life and noise of a mechanism such as the shear drive unit, are improved.

In the above description, while the overall cutting is completed at the instant when the shear velocity Vs coincides with the material velocity Vl, a synchronization section where Vs=Vl is actually provided and cutting is generally made in the section. The essential operation described above is not changed even if such a section is provided.

Another embodiment is now described. The above embodiment has particularly no limitation except for the boundary condition when the optimum velocity trajectory is obtained. In this embodiment, when the prior art straight trajectory is used as the velocity trajectory, the trajectory with minimum energy required is obtained. That is, the configuration of this embodiment is the same as the above embodiment with the exception of a command generator for generating the trajectory condition.

FIG. 3 shows examples of the prior art straight velocity trajectories. Since these trajectories are defined to satisfy the conditional equations (3), (4) and (5), any consideration is made to the required energy.

Figure 2:
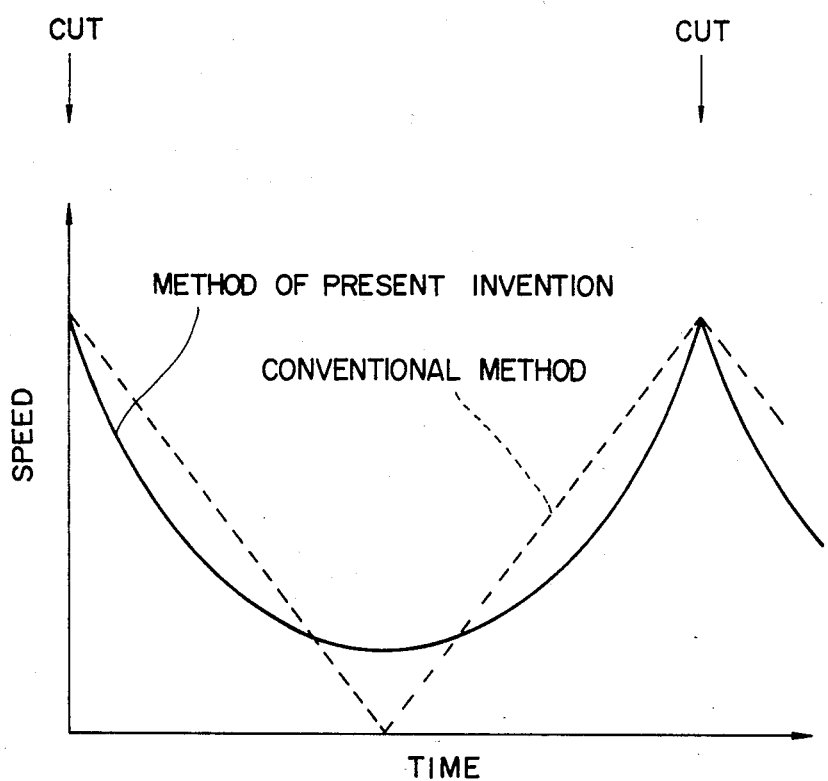
FIG. 2 graphically illustrates velocity tracks of shears in the embodiment shown in FIG. 1 and a prior art.
Figure 3A:
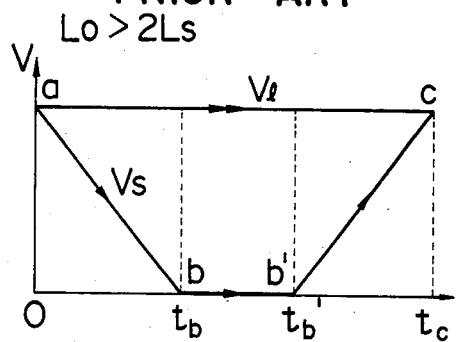
FIGS. 3(a) to 3(e) illustrate various prior art straight speed track patterns, respectively.
Figure 3D:
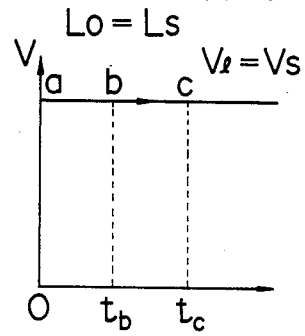
Figure 3B:
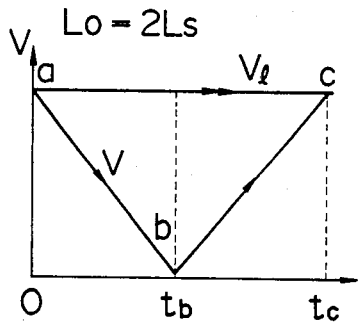
Figure 3E:
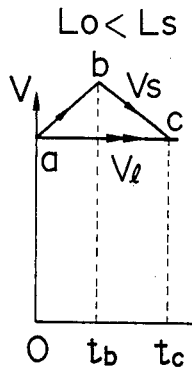
Figure 3C:
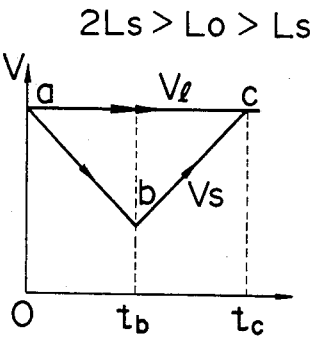
Figure 4A:
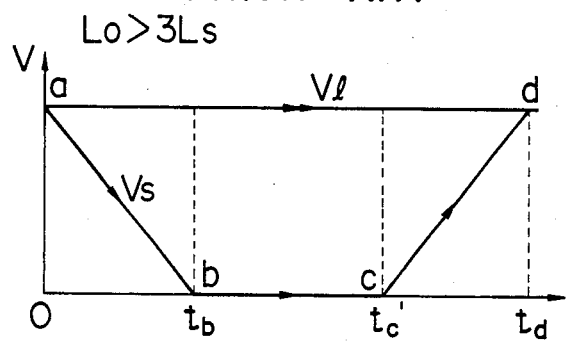
FIGS. 4(a) to 4(e) illustrate velocity track patterns in another embodiment implementing a method of the present invention.
Figure 4D:
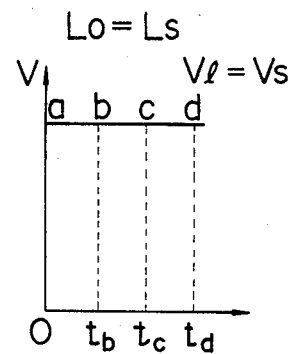
Figure 4B:
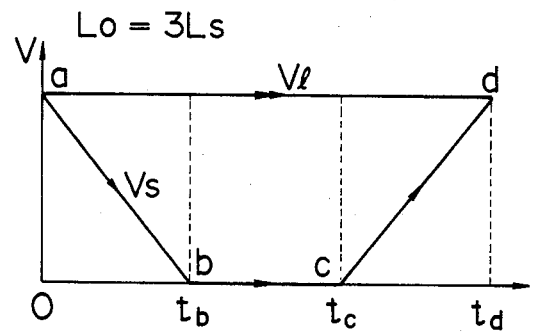
Figure 4E:
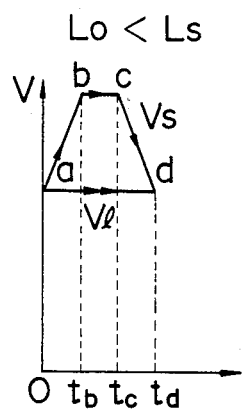
Figure 4C:
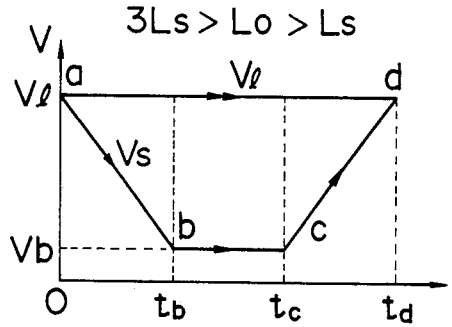

Thus, in this embodiment, when deceleration is changed to acceleration or acceleration is changed to deceleration as shown in FIG. 4, a section in which movement is made at a constant velocity is provided between the deceleration and the acceleration and the velocity trajectory is determined so that the required energy is minimized. That is, this corresponds to the fact that the velocity trajectory obtained by the above embodiment (refer to the secondary curve of FIG. 2) is approximated by three straight lines.

In this case, the equation corresponding to the equation (2) of the above embodiment is as follows:

$$J = \int_o^T i^2 dt \qquad (100)$$

$$= 2 \cdot J(tb, Vb) = 2 \cdot \frac{1}{tb}(Vb - Vl)^2 \cdot \left(\frac{I}{K_I}\right)^2$$

where tb is a time when the constant velocity Vb is reached from the deceleration condition (acceleration condition). From the conditions of the equations (3), (4) and (5), tb and Vb are expressed as follows:

$$tb = (Lo \cdot Vb - Ls \cdot Vl)/(Vb - Vl) \cdot Vl \qquad (101)$$

If the equation (101) is used in the equation (100) and the following equation is solved:

$$dJ(Vb)/dVb = 0 \qquad (102)$$

the following equation is obtained:

$$Vb_1 = Vl \qquad (103)$$

$$Vb_2 = Vl - \frac{3}{2} \cdot \frac{(Lo - Ls)}{Lo} \cdot Vl \qquad (104)$$

Accordingly, it is understood that the consumption power is minimized at Vb. Further, tb at this time is as follows:

$$tb = \frac{1}{3} \cdot \frac{Lo}{Vl} \qquad (105)$$

Accordingly, it is understood that the velocity trajectory is established so that the period of the shear 13 is divided into three equal parts and the equations (3), (4) and (5) are satisfied.

The required energy at this time is given by:

$$J\left(\frac{1}{3} Lo/Vb\right) = \frac{27}{2} \cdot \frac{(Lo - Ls)^2}{Lo^3} \cdot Vl^3 \cdot \left(\frac{I}{K_I}\right)^2 \qquad (106)$$

The energy consumption in the heavy duty cycle of Lo=2Ls is given by:

$$J = \frac{27}{16} \cdot \frac{Vl^3}{Ls} \cdot \left(\frac{I}{K_I}\right)^2 \qquad (107)$$

As compared with the consumption energy of the prior art straight trajectory shown by the equation (27), the energy consumption is as follows:

$$27/16/2 = 27/32 = 0.843 \qquad (108)$$

The energy consumption is 84.3% of the prior art.

The second embodiment corresponds to the modification of the first embodiment in which the velocity trajectory is approximated by three straight lines. The consumption of energy is slightly deteriorated, and since the velocity trajectory is straight, the acceleration trajectory is constant and the position trajectory is expressed by a quadratic equation. Accordingly, the hardware and software for realizing the embodiment are simple. If the number of the approximating straight lines is increased, it is possible to approximate the optimum trajectory to any extent. However, the hardware and software are complicated accordingly and merit in using straight lines is reduced.

The method of controlling the rotary cutter according to the present invention is useful to reduce running cost while operating under the condition of minimum energy consumption when material of long size, such as a steel plate or corrugated cardboard moving between a pair of shears, is cut in a sheet.

We claim:

1. A method of controlling a rotary cutter in which material of long size, moving between a pair of rotating shears, each having a shearing edge on a peripheral surface thereof, is cut in a predetermined cut length by controlling a motor for driving the shears, characterized in that the method comprises the steps:

detecting a material moving velocity $V_l$ and determining a material moving distance $l_l$;

detecting a shearing edge moving velocity Vs and determining a shearing edge moving distance ls;

detecting a armature current i of the motor;

calculating an optimum shear position $x_1^{}(l_l)$, a minimum optimum shear velocity $x_2^{}(l_l)$ and an optimum motor current $i^{**}(l_l)$ using the following equations:

$$x_1^{**}(l_l) = (Ls - Lo)\left\{ -2\left(\frac{l_l}{Lo}\right)^3 + 3\left(\frac{l_l}{Lo}\right)^2 \right\} + l_l$$

$$x_2^{**}(l_l) = \left( (Ls - Lo)\left\{ -6\frac{l_l^2}{Lo^3} + 6\frac{l_l}{Lo^2} \right\} + 1 \right) V_l$$

$$i^{**}(l_l) = \frac{I}{K_l}\left( (Ls - Lo)\left\{ -12\frac{l_l}{Lo^3} + \frac{6}{Lo^2} \right\} + 1 \right) V_l^2 +$$

-continued $$\frac{I}{K_l}\left( (Ls - Lo)\left\{ -6\frac{l_l^2}{Lo^3} + 6\frac{l_l}{Lo^2} \right\} + 1 \right) \frac{dV_l}{dt}$$

where Ls is a peripheral length of the shearing edge, Lo is a cut length, $K_I$ is a torque constant of the motor, and I is an inertia moment of the motor and the shears; and controlling the motor by using a servo system in which the shearing edge moving velocity and the armature current are fed back; and applying said optimum shear velocity and said optimum motor current to said servo system to achieve said optimum shear position, which is also applied to said servo system.

\* \* \* \* \*